Aug. 7, 1962 J. H. WATSON 3,048,723
ELECTRIC BRAKED MOTOR
Filed Dec. 29, 1958 4 Sheets-Sheet 2

INVENTOR.
JACK H. WATSON
BY Edwin Coates
ATTORNEY.

Aug. 7, 1962 J. H. WATSON 3,048,723
ELECTRIC BRAKED MOTOR
Filed Dec. 29, 1958 4 Sheets-Sheet 3

INVENTOR.
JACK H. WATSON
BY
Edwin Coates
ATTORNEY.

Aug. 7, 1962 J. H. WATSON 3,048,723
ELECTRIC BRAKED MOTOR
Filed Dec. 29, 1958 4 Sheets-Sheet 4

INVENTOR.
JACK H. WATSON
BY
Edwin Coates
ATTORNEY.

3,048,723
ELECTRIC BRAKED MOTOR
Jack H. Watson, Los Angeles, Calif., assignor to Douglas Aircraft Company, Inc., Santa Monica, Calif.
Filed Dec. 29, 1958, Ser. No. 783,462
9 Claims. (Cl. 310—77)

This invention relates to an alternating current three phase induction type motor and more particularly to such a motor which operates also as a brake.

To better understand the teachings of this invention the inventor feels it beneficial to first consider some of the basic principles involved in the operation of an alternating current, three phase induction motor.

All electric motors have two fundamental electric circuits which are linked by a common magnetic circuit. The first of the electric circuits is called the field circuit because it provides the magnetic field. The second electric circuit is called the power circuit because it is from this circuit that power, either electrical or mechanical, is taken from the machine. In most electric motors the field circuit is a series of loops of an electric current carrying conductor. When an electric current is conducted through the loops a magnetic field is developed in the air region surrounding the loops which tends to link the loops together. Likewise, in most electric motors, the power circuit is a closed conductor path and is placed in the magnetic field developed surrounding the field circuit. When the power circuit is removed from the magnetic field in any manner whatever or when the magnetic field is caused to disappear in any manner whatever a momentary electric current is caused to flow in the power circuit. This momentary electric current produces its own magnetic field in the air region surrounding the power circuit. Likewise, the momentary induced electric current will cause to flow in the field circuit an electric current with its associated magnetic field. Thus a mutual magnetic field is developed between the field circuit and the power circuit in the mutual air gap surrounding the two.

Throughout this description, the electrical power source is defined as being three phase. This however is not to be construed as necessarily limiting the invention thereto, because it will be obvious to persons skilled in the art, that single phase as well as other polyphase electrical power sources can be adapted to operate the present braked motor.

If we make the field circuit a plurality of groups of three separate coils each of electrical current carrying conductors, and electrically connect each coil of each group to a different phase of a three phase alternating electrical power source, maintaining the same phase connection for like coils in adjacent groups, we create a rotating magnetic field due to the alternating characteristics of the currents in the different phases of the three phase source. Now if we place in juxtaposition to the field circuit the power circuit, and cause the field circuit to electrically rotate by applying to it, as previously described, the three phase alternating electrical power source we will induce currents in the power circuit. As these induced currents are in a magnetic field they tend to move across this field. The direction of the force developed among these currents, in the power circuit and the magnetic field producing them, will be such that the power circuit tends to follow the rotating field. In this fashion a rotation of the power circuit can be developed. The direction of rotation of the rotor depends upon the orientation of the phases connected to the groups of three coils forming the field circuit.

In the standard electrical motor, the field circuit is mounted on a stationary element called the stator, and the rotating power circuit is mounted on a rotatable element called the rotor.

Conventional alternating current motors of the induction type are generally considered less suitable than direct current motors for high inertia loads. A direct current series motor has a high starting torque while conventional, induction, high frequency, alternating current motors have lower starting than running torques. In addition, direct current operated stopping brakes have been perfected to a high degree while alternating current brakes tend to be heavy unless the alternating current is first rectified and a direct current brake is used. The alternating current motor with rectified direct current brake has been found to be too large and cumbersome for use in and around airplanes. Since most aircraft power supplies and associated ground power supplies are alternating current 400 cycle, it was found necessary to devise a novel motor for airborne use which would operate off the available power but which would not be large nor of excess weight. One use for which a motor of this type was designed was to operate a hoist device to raise an activated bomb into the bomb rack aboard a military airplane. It has been found, because of the hazards involved in such an operation, that a positive brake means must be provided. This invention provides such a motor and brake. As well as its use by the military, this invention has been found useful in the commercial fields of fuel pump operation, servo mechanisms and actuator controls. Because of the use intended for this invention, it was imperative that a motor-brake be designed which would develop a high starting torque, since the maximum loads to which the motor will be subjected would be during starting conditions, therefore producing a high inertia load on the motor.

In general, in its preferred form, the braked-motor includes a stator. Such stator consists of a .007 inch thickness strip of iron, or the like, wound into a spiral which is supported between inner and outer rings. Slots are cut in the spiral to accept the coils of the field circuit. The rotor consists of two non-laminated solid disks mounted on a shaft, one on either side of the toroid stator. The losses developed by the use of the solid iron rotors are reduced by the addition of a high silicon iron shim to that face of each rotor which is adjacent the stator. This shim, in connection with the power circuit of the rotors, develops the desired high starting torque characteristic. When the electrical power is off, mechanical springs slide the rotors axially away from the stator into contact with brake disks. The brakes are released when the alternating current voltage, applied to the stator windings, magnetically attracts the thin shim on the face of each rotor to overcome the spring pressure. At this point it is no longer a brake but an induction motor and the rotors begin to turn because of currents induced in the conducting bars embedded in the rotors.

Other features and advantages of the present invention will be apparent from the following description taken in connection with the accompanying drawings in which.

Figure 1:
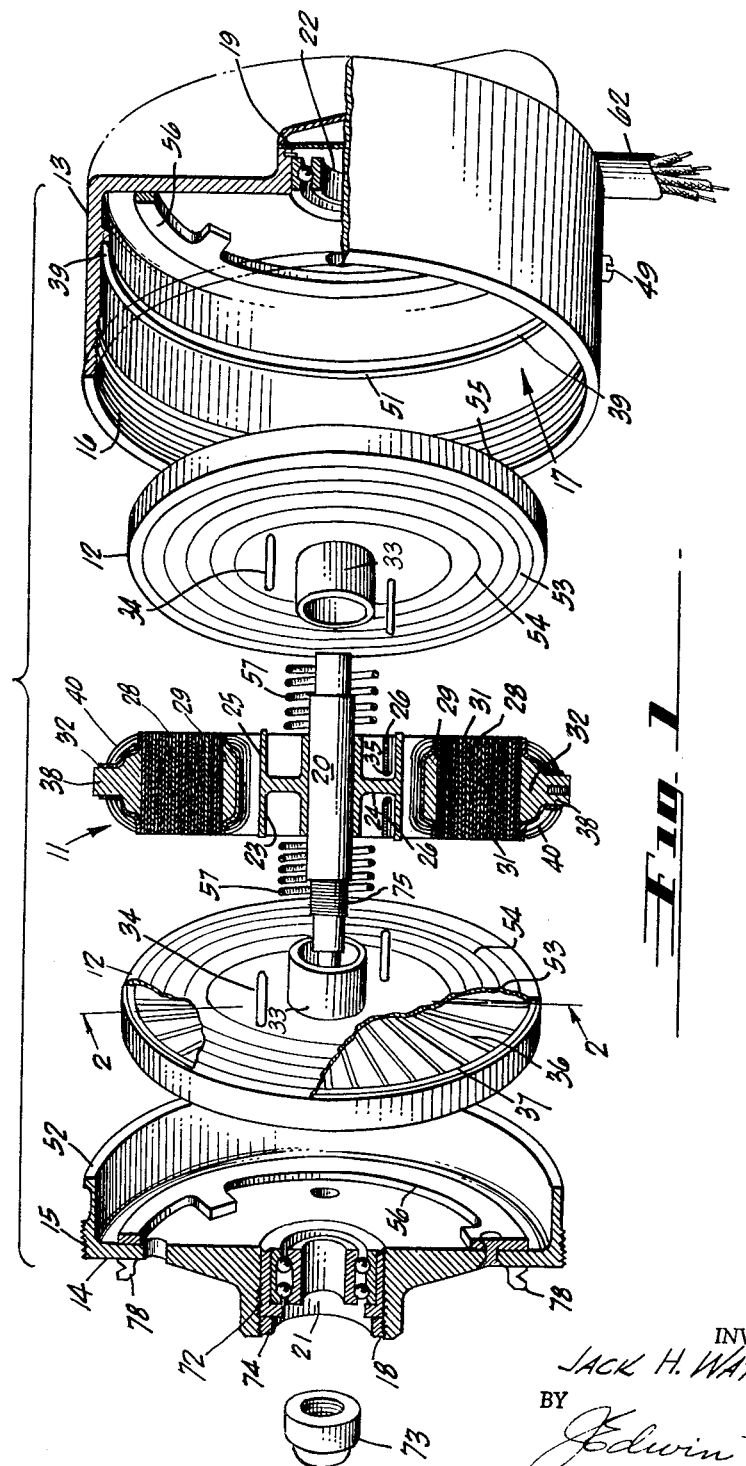
FIGURE 1 is an exploded perspective view partly in section showing the component parts of the preferred embodiment of the motor.
Figure 2:
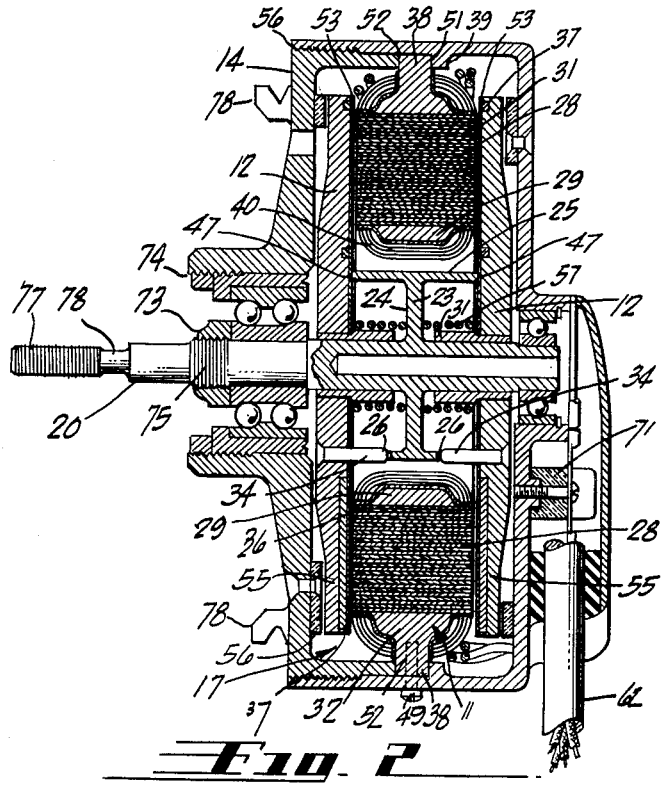
FIGURE 2 is a cross sectional view of the motor showing the arrangement of the stator in relationship to the dual rotors.
Figure 5:
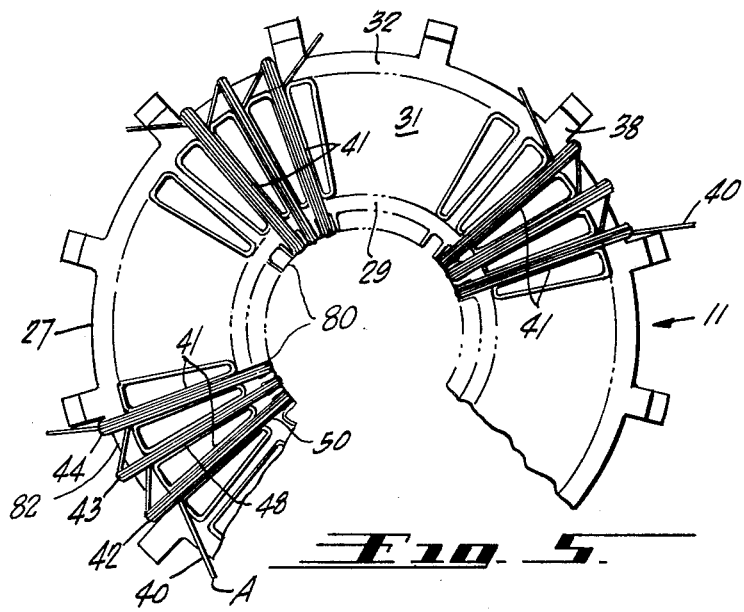
FIGURE 5 is a diagrammatic view of a portion of the coils for one phase of the three phase stator.

Referring now to FIGURES 1, 2, and 5 in detail, the braked motor includes a flat, hollow, two piece body. The body has a female section 13 and a male section 14. The female section 13 has a portion of its periphery internally threaded at 16 while the male section 14 has a portion of its exterior surface threaded at 15 so that by bringing the two threaded portions 15, 16 of the two sections 13, 14 respectively into a mating position and then rotating either section in relationship to the other, the two sections 13, 14 can be mated together thereby forming a chamber 17 within the said mated sections.

Extending centrally through the two mated body sections 13, 14 and extending outwardly of the chamber 17 through apertures 18, 19 in the male and female body sections 14, 13 respectively is a rotatable hubbed shaft 20. The said apertures 18, 19 contain conventionally mounted ball bearings 21, 22 respectively so that the said shaft 20 is in rotatable contact with the said ball bearings 21, 22. The ball bearing 21 is mounted within an externally threaded flanged adjustment sleeve 72. Said sleeve is rotatably mounted in the internally threaded portion of the said aperture and is held in place by a retention nut 74. To provide a means for adjusting the length of the shaft 20 contained within the chamber 17, a conventional nut 73 is mated with an externally threaded portion 75 of the shaft 20. The said nut 73 is brought to bear against the ball bearing 22. By rotating the nut 73 and the externally threaded flanged adjustment sleeve 72, the length of the shaft 20 contained within the chamber 17 can be changed. The said shaft 20 is provided with a hub-like portion 23. Said hub 23 has a web 24 extending radially in the plane passing through the chamber bisecting the chamber into two equal segments and terminates in a annular flange 25. Said flange 25 is concentric with the axis of rotation of the shaft 20 and extends on both sides of the radially extending web 24. Located at diametrically opposite points around the annular flange 25 are a pair of pin receiving notches 26. These notches will be explained in more detail later.

Co-axial with the axis of rotation of the shaft 20 and symmetrically disposed with relationship to the chamber bisecting plane is the stator 11. The stator is composed of a plurality of laminations formed of a continuous ribbon .007 thickness, high silicon iron 28 wound into a tight spiral about an inner stainless steel retaining ring 29. Said layers of iron ribbon are insulated from each other and are held in a ring-like configuration by an outer stainless steel retaining ring 32. To provide an absolute retaining force on the spiral 28 the outer retaining ring 32 is first expanded by heat, then placed in contact with periphery of the outer layer of spiral 28 so that its layers are circumscribed by the ring 32. As the ring 32 cools it contracts, thereby applying a restraining force radially inwardly against the spiral 28. The thickness of the spiral 28 measured along the axis of rotation of the shaft 20 is slightly less than the corresponding height of the hub flange 25. Radially extending outwardly from the spiral are a plurality of outer ring stator support fingers 38. Said fingers 38 have their center line in the chamber bisecting plane and extend outward from the spiral 28 so that they come to rest on the annular stator support ledge 39 on the inside surface 51 of the female body section 13. As the threaded portion 15 of the male body section 14 is mated with the threaded portion 16 of the female body section 13 the advancing edge 52 of the male body section 14 comes into contact with the plurality of outer ring stator support fingers 38 on the finger surface opposite the surface in contact with the annular stator support ledge 39 and thereby restrains the stator from axial movement parallel to the axis of shaft rotation. To prevent the stator 11 from rotating, a conventional fastening means 49 extends through an aperture in the female body section 13 into a receiving aperture in one of the plurality of outer ring stator support fingers 38.

In the two parallel side faces 31 of the spiral 28 are a plurality of shallow radial notches 41. Said notches are of such a depth and width as to receive a coil of a plurality of loops of conductor 40. Adjacent notches 41 have their radial centerlines approximately 10° apart, so that in any 30° there are three such radial notches.

Adjacent to the two parallel faces 31 of the stator 11 are dual rotors 12. The rotors 12 are co-axial with the axis of rotation of the shaft 20 and have a collar 33 which extends into the region between the shaft flange 25 and the shaft 20. The length of the collar 33 is such that its extremity does not come into contact with the radially extending web 24 of the shaft. Opposite the pin receiving notches 26 in the shaft hub 23 and extending into them are the rotor locking pins 34. These pins 34 are mounted in apertures in the rotors 12 and are of such a diameter as to slidably fit into the notches 26 but not of sufficient length, when fully received by the notches 26, to come into contact with the bottom of the notch 35. As the rotors 12 rotate through the magnetic coupling of the rotor and stator, the motion of the rotors is transmitted to the shaft 20 by means of the rotor locking pins 34 bearing against the wall of the pin receiving notches 26.

The dual rotors 12 consist of a plurality of radially directed metallic electrical current conducting bars 36. These bars are shorted together by end conductor rings 37. The whole configuration of bars 36 and rings 37 is imbedded into a suitable metal such as iron so that one face of the bars 36 and rings 37 is exposed on the face of the rotors 12 adjacent to the stator 11. This type of rotor is called by those skilled in the art a conventional squirrel cage rotor. On the face of the rotors 12 containing the exposed bars 36 and rings 37 is placed a thin high silicon iron shim 53 of approximately .007 inch thickness, said shim 53 covering the complete face of the rotors 12. The solid disk, non-laminated, rotors 12 are used because the starting torque characteristics are improved. The increased losses normally developed in the solid disk rotors are reduced by the use of a high silicon content iron shim 53 between the solid disk rotors 12 and the coils of the stator 11. A shim of .007 thickness or the like is used so that the ratio of the metallic bars 36 to the iron of the shim 53 will give a starting torque greater than the running torque. To provide the maximum starting torque, there are a plurality of circular grooves 54 in the shim 53. Said grooves are of such depth as to expose the bars 36 and rings beneath.

On the face of each of the dual rotors 12 opposite to the stator 11 is a braking shoulder 55. Adjacent to the braking shoulder 55 and fastened by means of conventional fastening means to the body sections 13, 14 are the circular braking shoes 56. Located between the shim 53 on the rotors 12 and the shaft radially extending web 24 are the braking springs 57. During the braking operation of the motor, to be explained in more detail later, the spring 57 causes the rotors 12 to move axially from in contact with shaft circular flange 24 and into contact along their braking shoulders 55 with the braking shoes 56. Through the force of the said spring 57 pushing the rotors 12 axially against the braking surfaces 56 the rotor elements are prevented from rotating.

Figure 4:
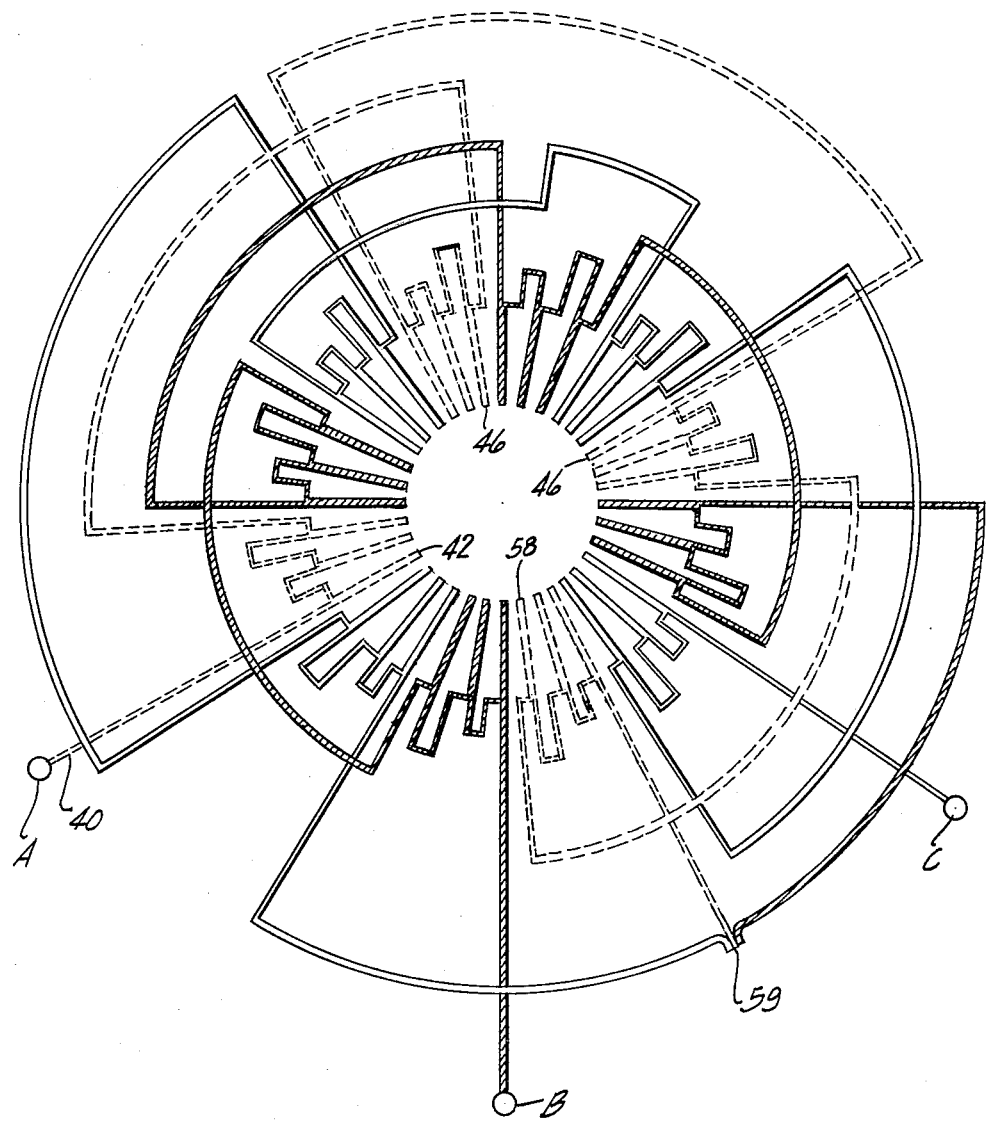
FIGURE 4 is a schematic representation of the arrangement of the three phase electrical conductor path in the coils of the stator.

The stator element is electrically connected to a three phase source of electric power as shown in FIGURES 4 and 5. For the ensuing description I will describe the winding of the coils for the "A" phase of the three phase circuit. This discussion applies equally to the windings of the B and C phases coils. The conductor path 40 for phase "A" is formed into a plurality of loops, thereby forming a bundle of conductor paths 42. Said bundle is placed in a groove 50 formed by one of the plurality of radial notches 41 in the parallel faces 31 and one of a plurality of notches 80, 82 in the inner and outer retaining rings 29, 32 respectively. The bundle 42 is of such a diameter that it is totally contained within the groove 50. Adjacent to the first bundle 42 is a second bundle of loops 43 also totally contained in a groove 48. The second bundle 43 is wound from the same continuous conductor path 40 as is the first bundle 42. In a similar manner adjacent to the second bundle is a third bundle 44 again contained in a groove and wound from the said continuous conductor path 40. The three bundles 42, 43, 44 actually form one coil which has been divided into three segments. Because of the alternating electric current passing through the loops of bundles 42, 43 and 44 a magnetic field is developed in the air region surrounding the bundles 42, 43, 44. Since the bundles are made up of loops of conductor paths from the single conductor path 40 of phase A, the magnetic field developed in the air region surrounding each of the bundles 42, 43, 44 will add together to form one magnetic field. Therefore by splitting the actual one coil into three bundles we have effectively increased the air region surrounding the coil and thereby increased the magnetic field developed in the air region. The stator conductor path coils are wound in the circumferential notches in the same fashion that most conventional three phase alternating current motor stators are wound. Displaced 90° about the stator from the first series of phase "A" bundles is another group of three bundles forming a single coil which will have been wound from the same continuous conductor of the first series.

To produce a magnetic field about the stator coils which will be projecting outward into the air region surrounding each parallel face 31 of the stator 11, the first bundle 42, 45, 46, 58, as best shown in FIGURE 4, of each continuously wound conductor path coil is placed in the groove which is 90° displaced from the like bundle in the preceding coil as the coil bundles are wound about the spiral in a clockwise direction.

Figure 6:
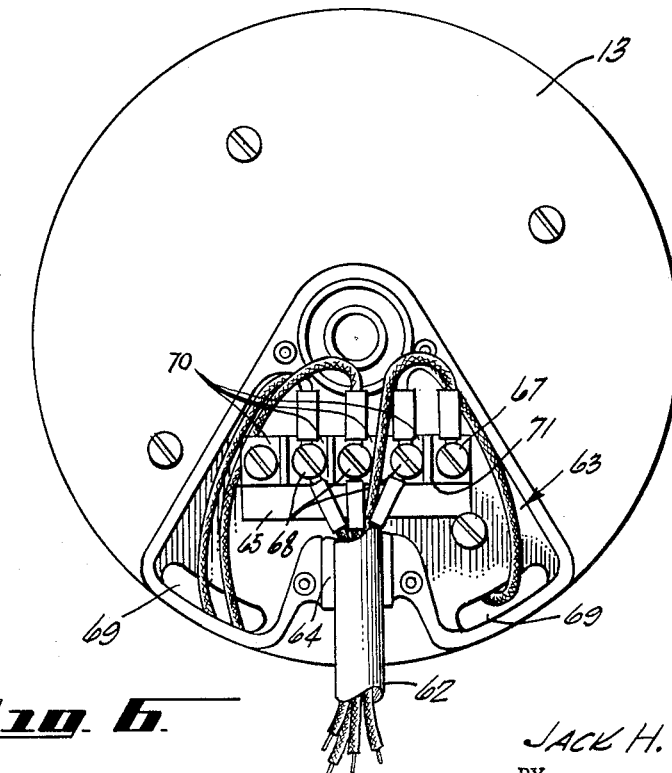
FIGURE 6 is an end view of the motor casing with the sealing cap removed exposing the electrical connections of the electrical power source to the terminals of the motor.

Referring to FIGURE 6, the alternating current three phase electrical power source is supplied to the braked motor by a four conductor cable 62. Said cable 62 is fed into a sealed terminal chamber 63 in the female body section 13 through a sealing sleeve 64. Each of the said four conductors is connected to one terminal of a five post terminal strip 65 within the chamber 63. Four of the posts 70 of said strip 65 are insulated from the said body section 13 by an insulating strip 71 between the strip 65 and the said body section 13. Three of the terminals 66 on the said strip 65 also contain end connectors 68 for the conductor paths to each of the phase windings of the coils on the stator 11. Running from the said three terminals to the phase winding of the stator coils are the phase conductor paths. Said conductor paths enter the terminal chamber 63 through slots 69 in the female body section 13. These slots 69 have been so located that the conductor paths entering the chamber 17 will not interfere with the rotation of the rotors 12. The fourth conductor contained in the said cable 62 is connected to a ground terminal 67 on the said terminal strip 65. Said ground terminal 67 is connected without insulation to the body section 13, thus grounding the body of the braked motor. As best seen in FIGURE 4, all the phase circuits are grounded 59 to the body of the braked motor.

Referring again to FIGURE 2, to enable the use of the braked motor to operate an airplane bomb hoist, a plurality of set screw attachment hooks 73 are provided on the external face of the male body section 14. The exposed extremity of the shaft 20 has been threaded 77 and notched 78 so as to receive the associated bomb hoist mechanism. This drawing depicts the preferred embodiment of a typical use of this invention, and has been included only to provide clarity in the description, and not to limit the scope of the invention.

Figure 3:
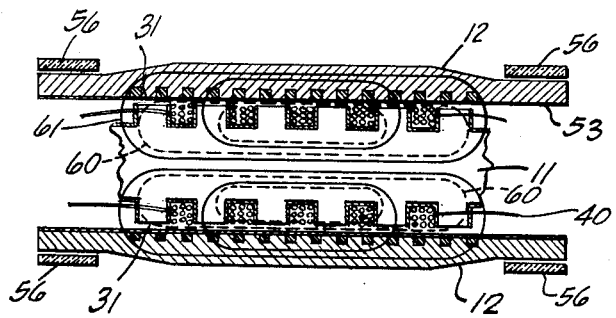
FIGURE 3 is a diagrammatic view of a portion of the motor showing the magnetic field pattern during running and braking release operation of the motor.

Still referring to FIGURE 2 in association with FIGURE 3, there is shown the two represented magnetic fields that are developed surrounding the rotors 12 and stator 11 during the operation of the braked motor. This diagram is shown slightly distorted so as to give a clearer picture. At the instant when the source of electrical power is applied through conductors 40 to the field coils of the stator, the initial magnetic field 60, represented in FIGURE 3 by the dash lines, is developed surrounding the coils. This field extends outward from the stator 11 and into each shim 53, thereby magnetically attracting the paramagnetic iron shim. As the shim and the rotor to which each is affixed moves toward the stator, the rotors move out of contact with the braking shoes 56. The rotors 12 are pulled axially inward toward the stator 11 by the magnetic force until their movement is stopped by the edge surfaces 47 of the circular flanges 25 of the shaft hub 23. Since the field is rotating due to the alternating current source connected to the coils, an electric current will be developed in the closed path power circuit of the rotors 12, this developing a common magnetic field 61 between the stator and rotor. As described previously, this causes the rotors to rotate. The rotating rotor tends to attain the same speed of rotation as the electrically rotating magnetic field. However, the rotors cannot attain the speed of rotation of the magnetic field, for were they to reach this speed, there would be no relative motion of the rotors and the magnetic field necessary to produce the rotation. The mutual magnetic field 61 retains the rotors 12 in this position until the magnetic field is diminished. When the mutual magnetic field 61 is interrupted by means of an interruption in the three phase alternating electric current source supplied to the field circuit, the magnetic force holding the rotors in contact with the circular flange 25 of the shaft hub 23 is also broken and the rotors move away from the stator under the action of the braking springs 57 and into contact with the braking shoes 56. The frictional force developed between the rotating rotors 12 and the braking shoes 56 cause the rotors 11 to be brought to a stationary position.

Although the now preferred embodiment and methods of the present invention have been illustrated and described it is to be understood that the invention need not be limited thereto for it is susceptible to changes in form, detail and application within the scope of the appended claims.

I claim:

1. An electric motor comprising: a parallel faced non-rotatable stator having a plurality of radially wound magnetic force producing coils, each of said coils having first parts directed radially along opposite faces of said stator, second parts directed across the periphery of said stator, and third parts constituting axially directed loops near the center of the stator; a pair of rotatable rotors respectively coaxially adjacent the opposite faces of said stator; means on said rotors for developing rotation thereof; a rotation transmitting means coupled coaxially to said dual rotors to transmit externally of said motor the rotation of the said rotors; and a source of electrical energy connected to said coils to develop a magnetic coupling with said rotor whereby said rotor is caused to rotate.

2. An electric motor comprising: a parallel faced spiral wound non-rotatable laminated metallic ring having a plurality of grooves, each formed by intersecting pairs of notches, said pairs of notches being constituted by a first pair disposed radially in said parallel faces and a second pair disposed across the outer and inner periphery of said ring parallel to the axis of rotation of said motor; an electric current conducting means disposed in said grooves, said means comprising a plurality of bundles of a plurality of loops wherein three adjacent bundles form a magnetic field producing coil, said bundles being wound from a continuous segment of said conducting means; dual rotatable rotors respectively coaxially adjacent opposite faces of said stator; means on said rotors for developing rotation thereof; a rotation transmitting means coupled coaxially to said dual rotors to transmit externally of said motor the rotation of the said rotors; and a source of electrical energy connected to said coils to develop a magnetic coupling with said rotor whereby said rotor is caused to rotate.

3. An electric rotary motor comprising: a parallel faced spiral wound, non-rotatable, laminated metallic ring having a plurality of grooves, each formed by intersecting pairs of notches, said pairs of notches including a first pair disposed radially in said parallel faces and a second pair disposed across the outer and inner periphery of said ring parallel to the axis of rotation of said motor; an electric current conducting means disposed in said grooves, said means comprising a plurality of bundles of a plurality of loops wherein a first bundle being adjacent to a second bundle and a third bundle being adjacent to the second in a clockwise direction about said stator form a magnetic field producing coil, each of said bundles being wound from a continuous segment of said electric current conducting means; dual rotatable rotors maintained coaxially adjacent to said stator; means on said rotors for developing rotation thereof; a rotation transmitting means coupled coaxially to said dual rotors to transmit externally of said motor the rotation of said rotors; a four wire, three phase source of electric energy, said source being connected one phase wire to each first bundle of alternate coils of five clockwise adjacent coils and the third bundle of each coil being connected to the third bundle of each fourth coil disposed 90° of arc in a clockwise direction from each coil and the first bundle of each coil being likewise connected to the first bundle of each fourth coil, and the first bundle of the last coils to be so connected being connected to ground.

4. An electric motor comprising: a non-rotatable stator having a plurality of radially wound magnetic force producing coils, each of said coils having first parts directed radially along opposite faces of said stator and second parts directed across the periphery of said stator parallel to the axis of rotation of said motor, and third parts constituting axially directed loops near the center of the stator, dual rotatable rotors maintained coaxially adjacent to said stator; a plurality of metallic bars and rings flushly embedded in the face of said rotors adjacent to said stator, said bars and rings forming a closed path; high efficiency metallic shims attached to said rotor face adjacent to said stator and having a plurality of annular grooves exposing a portion of said bars and rings; a rotation transmitting means coupled coaxially to said dual rotors to transmit externally of said motor the rotation of said rotors; and a source of electrical energy connected to said coils to develop a magnetic coupling with said rotor whereby said rotor is caused to rotate.

5. An electric braked motor comprising: a casing; a non-rotatable stator having a plurality of radially wound magnetic force producing coils, each of said coils having first parts directed radially along opposite faces of said stator and second parts directed across the periphery of said stator parallel to the axis of rotation of said motor, and third parts constituting axially directed loops near the center of the stator; dual rotatable rotors maintained coaxially adjacent to said stator; means on said rotors for developing rotation thereof; a rotation transmitting means coupled coaxially to said dual rotors to transmit externally of said motor the rotation of the said rotors; a plurality of resistive means on said casing adjacent to said rotors to resist rotation of said rotors by contact therewith; means in contact with said rotors to move said rotors axially into contact with said resistive means; means on said rotors for releasing said rotors from in contact with said last mentioned means whereby said rotors are free to rotate; and a source of electrical energy connected to said coils to magnetically produce rotation of said rotors.

6. An electric braked-motor comprising: a casing; a non-rotatable stator having a plurality of radially wound magnetic force producing coils, each of said coils having first parts directed radially along opposite faces of said stator and second parts directed across the periphery of said stator parallel to the axis of rotation of said motor, and third parts constituting axially directed loops near the center of the stator; dual rotatable rotors maintained coaxially adjacent to said stator; means on said rotors for developing rotation thereof; a rotation transmitting means coupled coaxially to said dual rotors to transmit externally of said motor the rotation of the said rotors; a brake shoulder on said rotors on the side thereof opposite to said stator; a plurality of annular brake shoes mounted on said casing adjacent to said rotors for resisting rotation of said rotors by contact with said brake shoulders; a plurality of springs in contact with said stator and rotors coaxial with the axis of rotation of said rotors to initiate the contact between said brake shoulders and brake shoes; high efficiency metallic shims attached to said rotor faces adjacent to said stator for cooperating with said coils to release said brake shoulders from in contact with said brake shoes; and a source of electrical energy connected to said coils to magnetically produce rotation of said rotors.

7. A stator comprising: a toroid wound laminated ring having parallel faces, an inner and outer periphery, and a plurality of radial notches in said faces; a plurality of retaining rings in contact with said inner and outer periphery to retain said toroid ring rigid and said retaining rings having a plurality of notches wherein said toroid radial notches and retaining ring notches define a groove and wherein said grooves are contained in planes perpendicular to said parallel faces; and electric current conducting means disposed in said groove, said means comprising a plurality of bundles, each of a plurality of loops.

8. A rotor comprising: a disk-like metallic body having a first face perpendicular to the axis of rotation of said rotor; a plurality of radially disposed metallic bars flushly embedded in said first face; a plurality of metallic connecting rings connecting said bars into closed paths; and a high efficiency producing metallic shim attached to said first face to cover said exposed bars and rings.

9. A rotor comprising: a disk-like metallic body having a first face perpendicular to the axis of rotation of said rotor; a plurality of radially disposed metallic bars flushly embedded in said first face; a plurality of metallic connecting rings connecting said bars into closed paths and a high efficiency producing metallic shim attached to said first face to cover said exposed bars and rings, said shims having a plurality of circular grooves exposing a portion of said bars and rings.

References Cited in the file of this patent
UNITED STATES PATENTS

| | | |
|---|---|---|
| 1,594,398 | Wolkoff | Aug. 3, 1926 |
| 2,356,972 | Chubbuck | Aug. 29, 1944 |
| 2,469,808 | Aske | May 10, 1949 |
| 2,700,343 | Pezzillo | Jan. 25, 1955 |
| 2,727,163 | Meyer | Dec. 13, 1955 |
| 2,880,335 | Dexter | Mar. 31, 1959 |